(12) United States Patent
Yu et al.

(10) Patent No.: US 12,598,334 B2
(45) Date of Patent: Apr. 7, 2026

(54) LIVE-STREAMING STARTING METHOD, DEVICE AND PROGRAM PRODUCT

(71) Applicant: Beijing Bytedance Network Technology Co., Ltd., Beijing (CN)

(72) Inventors: Yongyi Yu, Beijing (CN); Le Yang, Beijing (CN)

(73) Assignee: Beijing Bytedance Network Technology Co., Ltd., Beijing (CN)

( * ) Notice: Subject to any disclaimer, the term of this patent is extended or adjusted under 35 U.S.C. 154(b) by 28 days.

(21) Appl. No.: 18/847,018

(22) PCT Filed: Mar. 13, 2023

(86) PCT No.: PCT/CN2023/081180
§ 371 (c)(1),
(2) Date: Sep. 13, 2024

(87) PCT Pub. No.: WO2023/179404
PCT Pub. Date: Sep. 28, 2023

(65) Prior Publication Data
US 2025/0203128 A1 Jun. 19, 2025

(30) Foreign Application Priority Data
Mar. 21, 2022 (CN) ......................... 202210279320.X

(51) Int. Cl.
*H04N 21/2187* (2011.01)
*H04N 21/44* (2011.01)
(Continued)

(52) U.S. Cl.
CPC ... *H04N 21/2187* (2013.01); *H04N 21/44012* (2013.01); *H04N 21/8456* (2013.01); *H04N 21/85406* (2013.01)

(58) Field of Classification Search
CPC ......... H04N 21/2187; H04N 21/44012; H04N 21/8456; H04N 21/85406; H04N 21/4384; H04N 21/262; H04N 21/47202
See application file for complete search history.

(56) References Cited

U.S. PATENT DOCUMENTS

2012/0166667 A1* 6/2012 Hall ........................ H04L 65/70
709/231
2012/0185530 A1* 7/2012 Reza ................ H04N 21/47214
709/203
(Continued)

FOREIGN PATENT DOCUMENTS

CN 102232298 B 10/2013
CN 107147919 A 9/2017
(Continued)

OTHER PUBLICATIONS

Notice to Grant Patent Right for Invention issued in CN Appl. No. 2022102790320.X on Jul. 2, 2024 (6 pages).
(Continued)

*Primary Examiner* — Adil Ocak

(57) ABSTRACT
Embodiments of the disclosure provide a live-streaming starting method, apparatus, device, storage medium, program product and program. The server receives a live-streaming starting request initiated by a terminal for streaming media; determines a starting segment according to a predetermined delay threshold, the starting segment comprising a media presentation description MPD file, an initialization segment, and a media segment corresponding to the delay threshold; and the terminal receives the starting segment sent by the server, and renders and plays a first frame of the streaming media using the starting segment. On the basis of a DASH protocol, the solution improves a live-streaming starting process, to enable a terminal to render and play a first frame only by initiating a starting request once, thereby effectively reducing a starting time and improving the user experience.

20 Claims, 4 Drawing Sheets

RECEIVE A LIVE-STREAMING STARTING REQUEST INITIATED BY A TERMINAL FOR STREAMING MEDIA — 301

DETERMINE A STARTING SEGMENT ACCORDING TO A PREDETERMINED DELAY THRESHOLD, THE STARTING SEGMENT COMPRISING A MEDIA PRESENTATION DESCRIPTION MPD FILE, AN INITIALIZATION SEGMENT, AND A MEDIA SEGMENT CORRESPONDING TO THE DELAY THRESHOLD — 302

SEND THE STARTING SEGMENT TO THE TERMINAL, THE STARTING SEGMENT BEING USED FOR RENDERING THE FIRST FRAME OF LIVE-STREAMING IN RESPONSE TO THE TERMINAL STARTING LIVE-STREAMING — 303

(51) Int. Cl.
   *H04N 21/845*     (2011.01)
   *H04N 21/854*     (2011.01)

(56) References Cited

U.S. PATENT DOCUMENTS

| | | | |
|---|---|---|---|
| 2017/0150206 A1 | 5/2017 | Hu et al. | |
| 2017/0289599 A1 | 10/2017 | Bai et al. | |

FOREIGN PATENT DOCUMENTS

| | | | | |
|---|---|---|---|---|
| CN | 109756755 A | 5/2019 | | |
| CN | 107147919 B | 11/2020 | | |
| CN | 112671694 A | 4/2021 | | |
| CN | 113794898 A | 12/2021 | | |
| CN | 114630157 A | 6/2022 | | |
| WO | 2009/097716 A1 | 8/2009 | | |
| WO | 2017166499 A1 | 10/2017 | | |
| WO | WO-2020184357 A1 * | 9/2020 | ....... | H04N 21/26258 |

OTHER PUBLICATIONS

Office action received from Chinese patent application No. 202210279320.X mailed on Dec. 7, 2023, 24 pages (15 pages English Translation and 09 pages Original Copy).

* cited by examiner

1

LIVE-STREAMING STARTING METHOD, DEVICE AND PROGRAM PRODUCT

CROSS REFERENCE TO RELATED APPLICATIONS

This application claims priority to Chinese Patent Application No. 202210279320. X, filed on Mar. 21, 2022 and entitled LIVE-STREAMING STARTING METHOD, DEVICE AND PROGRAM PRODUCT, which is incorporated herein by reference in its entirety.

FIELD

Embodiments of the present disclosure relate to the field of video processing, and in particular, to a live-streaming starting method, apparatus, device, storage medium, program product and program.

BACKGROUND

With the diversification of entertainment life, live streaming media has become an important part of people's entertainment life. The international standard Dynamic Adaptive Streaming over HTTP (DASH) is a common media resource distribution protocol for live streaming media.

In the prior art, when a user terminal starts live-streaming on a certain streaming media, a request for a media presentation description (MPD), a request for an initialization segment, and a request for a media segment need to be sequentially initiated based on a DASH protocol. After receiving responses to the requests from the live-streaming server, the user terminal may render and play the first frame. However, such a process of rendering and playing the first frame of live-streaming requires a long start time, which seriously affects the experience of the user.

SUMMARY

In view of the above problems, embodiments of the present disclosure provide a live-streaming starting method, apparatus, device, storage medium, program product and program.

According to a first aspect, an embodiment of the present disclosure provides a live-streaming starting method, applied to a server; the method comprising:

receiving a live-streaming starting request initiated by a terminal for streaming media;

determining a starting segment according to a predetermined delay threshold, the starting segment comprising a media presentation description MPD file, an initialization segment, and a media segment corresponding to the delay threshold; and sending the starting segment to the terminal, the starting segment being used for rendering the first frame of live-streaming in response to the terminal starting live-streaming.

According to a second aspect, an embodiment of the present disclosure provides a live-streaming starting method, applied to a terminal; the method comprising:

sending a live-streaming starting request of a streaming media to a server;

receiving a starting segment returned by the server, the starting segment being determined by the server according to a predetermined delay threshold; the starting segment comprising a media presentation description MPD file, an initialization segment, and a media segment corresponding to the delay threshold; and rendering and playing a first frame of the streaming media using the starting segment.

According to a third aspect, an embodiment of the present disclosure provides a live-streaming starting apparatus, applied to a server; the apparatus comprising:

a first transceiving module configured to receive a live-streaming starting request initiated by a terminal for streaming media;

a starting segment determining module configured to determine a starting segment according to a predetermined delay threshold, the starting segment comprising a media presentation description MPD file, an initialization segment, and a media segment corresponding to the delay threshold; and the first transceiving module further configured to send the starting segment to the terminal, the starting segment being used for rendering the first frame of live-streaming in response to the terminal starting live-streaming.

According to a fourth aspect, an embodiment of the present disclosure provides a live-streaming starting apparatus, applied to a terminal; the apparatus comprising:

a second transceiving module configured to send a live-streaming starting request of a streaming media to a server;

the second transceiving module further configured to receive a starting segment returned by the server, the starting segment being determined by the server according to a predetermined delay threshold; the starting segment comprising a media presentation description MPD file, an initialization segment, and a media segment corresponding to the delay threshold; and a playing module configured to render and play a first frame of the streaming media using the starting segment.

According to a fifth aspect, an embodiment of the present disclosure provides an electronic device, comprising: at least one processor, and a memory;

the memory storing a computer executable instruction;

the at least one processor executing the computer executable instruction stored in the memory, causing the at least one processor to implement the method of any of the first aspect or the second aspect.

According to a sixth aspect, an embodiment of the present disclosure provides a computer readable storage medium, wherein the computer readable storage medium stores a computer executable instruction, a processor, when executing the computer executable instruction, implements the method of any of the first aspect or the second aspect.

According to a seventh aspect, an embodiment of the present disclosure provides a computer program product, comprising a computer program, the computer program, when executed by a processor, implementing the method of any of the first aspect or the second aspect.

According to an eighth aspect, an embodiment of the present disclosure provides a computer program, wherein the computer program, when executed by a processor, implementing the method of any of the first aspect or the second aspect.

BRIEF DESCRIPTION OF THE DRAWINGS

To describe the technical solutions in the embodiments of the present disclosure or in the prior art more clearly, the following briefly introduces the accompanying drawings required for describing the embodiments or the prior art. Apparently, the accompanying drawings in the following description show some embodiments of the present disclosure, other drawings may also be obtained according to these drawings without creative efforts.

DETAILED DESCRIPTION

In order to make objects, technical solutions and advantages of the embodiments of the present disclosure more apparent, the technical solutions in the embodiments of the present disclosure will be clearly and fully described below in connection with the drawings related to the embodiments of the present disclosure. Obviously, the described embodiments are only a part but not all of the embodiments of the present disclosure. All other embodiments obtained by persons of ordinary skill in the art based on the embodiments of the present disclosure without creative efforts shall belong to the protection scope of the present disclosure.

With the diversification of entertainment life, live streaming media has become an important part of people's entertainment life. The international standard Dynamic Adaptive Streaming over HTTP (DASH) is a common media resource distribution protocol for live streaming media.

In the prior art, when a user terminal needs to play a certain streaming media on-demand, a request for a media presentation description (MPD), a request for an initialization segment, and a request for a media segment need to be sequentially initiated based on a DASH protocol. After receiving responses to the requests from the live-streaming server, the user terminal may render and play the first frame on-demand.

Figure 1:
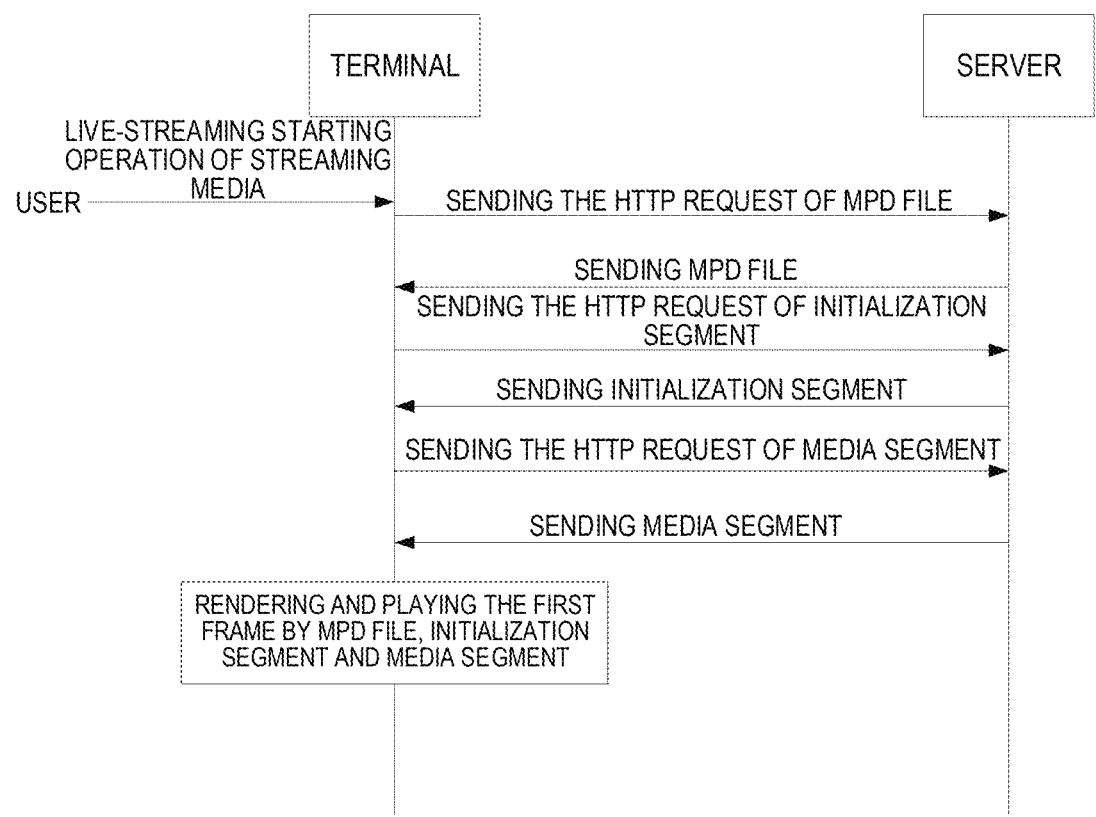
FIG. 1 is a schematic diagram of data flow of a live-streaming staring method in the prior art.

For example, FIG. 1 is a schematic diagram of data flow of a live-streaming starting method in the prior art. As shown in FIG. 1, after a user triggers a live-streaming starting operation for streaming media through a terminal, the terminal firstly initiates a first HTTP request to a server for requesting an MPD file. The server may return an MPD file to the terminal based on the first HTTP request, where the MPD file includes a template and a relevant address of a subsequent fragment. Then, the terminal initiates a second HTTP request to the server for requesting an initialization segment. Then, the server returns the initialization segment to the terminal based on the second HTTP request, where the initialization segment is used for decoding a subsequent media segment. Finally, the terminal initiates a third HTTP request to the server for requesting a media segment. The server returns the media segment to the terminal based on the third HTTP request, where the media segment includes related picture content of the first frame.

At this time, the terminal may perform a series of rendering processes by using the received MPD file, initialization segment, and media segment to obtain a first frame. At this time, the terminal displays the rendered first frame to the user for view, and the starting process of the streaming media is completed. Of course, after the starting process, the terminal may continuously request the relevant content of the subsequent frames, to enable the user to view the streaming media on demand.

Obviously, in the existing starting process of the streaming media based on the DASH protocol as shown in FIG. 1, the terminal needs to communicate with the server for many times, and the starting time is long, which seriously affects the experience of the user.

With regard to such a problem, according to the embodiments of the present disclosure, on the basis of a DASH protocol, a live-streaming starting process is improved, to enable a terminal to render and play a first frame only by initiating a starting request once, thereby effectively reducing a starting time and improving the user experience.

Specifically, the embodiments of the present disclosure provide a live-streaming starting method, apparatus, device, storage medium, program product and program. On the basis of a DASH protocol, a live-streaming starting process is improved, to enable a terminal to render and play a first frame only by initiating a starting request once, thereby effectively reducing a starting time and improving the user experience.

Figure 2:
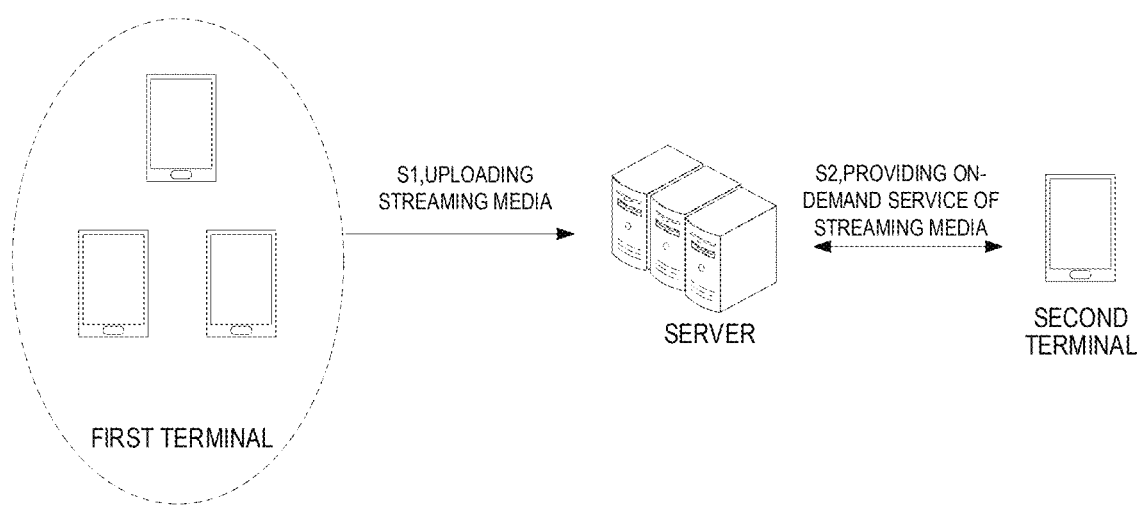
FIG. 2 is a schematic diagram of a network architecture on which the present disclosure is based.

Referring to FIG. 2, it is a schematic diagram of a network architecture on which the present disclosure is based. The network architecture shown in FIG. 2 may specifically include a first terminal, a second terminal, and a server.

The first terminal and the second terminal are user terminals respectively, the first terminal may be a terminal used by a user uploading streaming media, and the second terminal may be a terminal used by a user for streaming media on-demand. The first terminal and the second terminal both may specifically be a hardware device having a computation function, a communication function, and a display function, including but not limited to a smartphone, a desktop computer, a tablet computer, and the like.

The server may specifically be a server cluster provided on a cloud, and provides the user providing a streaming media with a storage function for a streaming media by the first terminal and the second terminal, and provides an on-demand function for an on-demand user of the streaming media.

The live-streaming starting method and device provided by the present disclosure are described in detail below through specific embodiments. The following embodiments may be combined with each other, and the same or similar concepts or procedures may not be repeated in certain embodiments.

Figure 3:
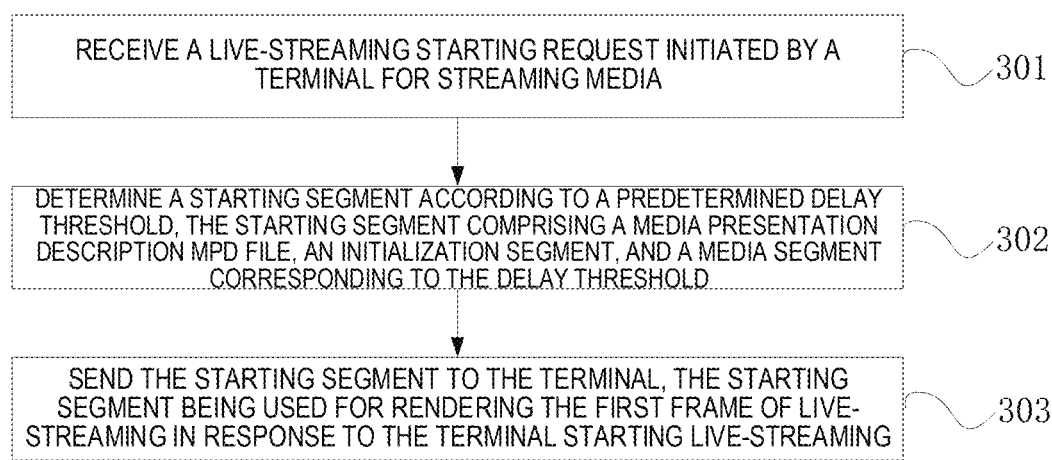
FIG. 3 is a schematic flowchart of a live-streaming starting method provided by an embodiment of the present disclosure.

It should be noted that an execution subject of the live-streaming starting method provided in this embodiment is the foregoing server. FIG. 3 is a schematic flowchart of a live-streaming starting method according to an embodiment of the present disclosure. As shown in FIG. 3, the live-streaming starting method may include the following steps:

Step 301: receiving a live-streaming starting request initiated by a terminal for streaming media.

Specifically, as for streaming media, it should be uploaded to a sever by a user providing the streaming media, and the media form thereof includes, but is not limited to, video media and audio media.

The terminal mentioned in this embodiment may be the second terminal shown in FIG. 2, that is, the terminal used by the on-demand user. A user may initiate an on-demand operation of streaming media by using the terminal. The terminal generates a corresponding live-streaming starting request according to the on-demand operation, and sends the live-streaming starting request to a server.

Step 302: determining a starting segment according to a predetermined delay threshold, the starting segment comprising a media presentation description MPD file, an initialization segment, and a media segment corresponding to the delay threshold.

Step 303: sending the starting segment to the terminal, the starting segment being used for rendering the first frame of live-streaming in response to the terminal starting live-streaming.

Specifically, the delay threshold refers to a parameter predetermined in the server, and indicates a minimum time difference between the timestamp of the latest frame of the streaming media and the start time of the media segment in the starting segment. In an optional implementation, a specific value of the delay threshold may be determined by itself according to an actual situation. For example, the delay threshold may be 8 s. For example, the starting segment includes an MP4 format file.

In this implementation, the server does not separately send the MPD file, the initialization segment, and the media segment to the terminal through multiple responses to the HTTP request. Instead, after receiving the live-streaming starting request of the terminal, the server sends the starting segment including the media presentation description MPD file, the initialization segment, and the media segment corresponding to the delay threshold to the terminal at a time.

The above processing manner greatly reduces the number of communication requests in the starting process, reduces the time required for starting, and improves the user experience.

Since the delay threshold in the embodiments of the present disclosure is predetermined by the server, in order to facilitate the terminal to make a request for the next frame of data of the streaming media, optionally, the staring segment further comprises: a segment serial number of the media segment and a start time of the media segment; wherein the segment serial number of the media segment and the start time of the media segment are used to generate an obtaining request of the terminal for a next frame.

By carrying related information such as a start time and a segment serial number of a media segment in a starting segment, a terminal may use the information to calculate a segment serial number of a media segment of a next frame, thus to directly request a media segment of next frame from a server, thereby improving the obtaining efficiency of the next frame.

Based on the foregoing embodiments, this implementation further provides two implementations to determine a starting segment according to a predetermined delay threshold.

Figure 4:
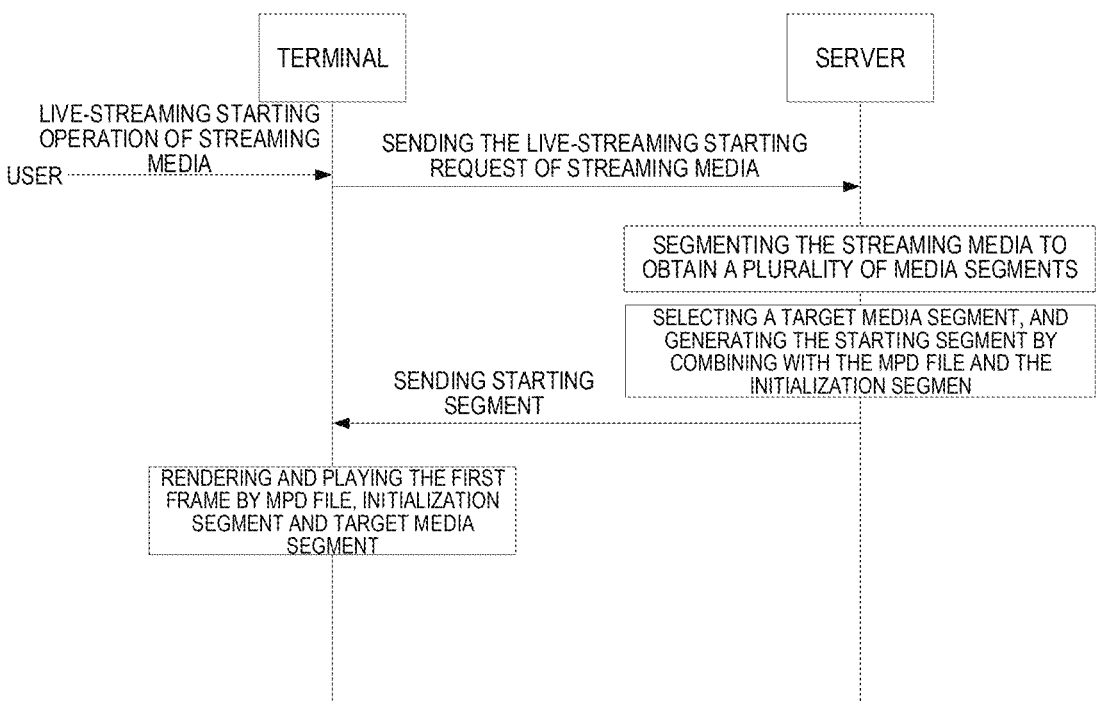
FIG. 4 is a schematic diagram of data flow of the live-streaming starting method according to an implementation of the present disclosure.

In one of the implementations, after receiving a live-streaming starting request, the server triggers a generation process of a starting segment, to determine a starting segment which conforms to a delay threshold:

Specifically, FIG. 4 is a schematic diagram of data flow of a live-streaming starting method provided in an implementation of the present disclosure. As shown in FIG. 4, when a user performs a live-streaming starting operation based on a terminal, the terminal sends a live-streaming starting request to a server.

At this time, the server firstly segments the streaming media according to a timestamp of each frame in the streaming media to obtain a plurality of continuous media segments with a same segment duration.

For example, a segment duration may be 4 s. The streaming media may be segmented to a plurality of media segments, such as, media segment 1[0 s,4 s], media segment 2[4 s,8 s], media segment 3[8 s,12 s], and media segment 4[12 s, 16 s], and so on.

Subsequently, the server selects a target media segment corresponding to the delay threshold according to a predetermined delay threshold. Specifically, the target media segment may be selected in a traversing manner, for example:

First, the server selects, according to a start time of each media segment, a media segment with a latest start time from all unselected media segments as a to-be-processed media segment.

Then, the server determines whether a time difference between the start time of the to-be-processed media segment and a timestamp of a latest frame in the streaming media is greater than the delay threshold;

in response to the time difference being greater than the delay threshold, taking the to-be-processed media segment as the target media segment; or in response to the time difference not being greater than the delay threshold, returning to selecting, according to the start time of each media segment, a media segment with a latest start time from all unselected media segments as a to-be-processed media segment.

Taking the foregoing selecting a target media segment from media segment 1[0 s,4 s], media segment 2 [4 s,8 s], media segment 3[8 s,12 s], and media segment 4[12 s, 16 s] as an example, the delay threshold is 8 s, and the time stamp of the latest frame in the streaming media is 18 s.

The start time of the media segment 4 is 12 s, i.e., the latest start time. Therefore, the server firstly takes the media segment 4 as the to-be-processed media segment. It can be seen that the difference between the start time 12 s of the media segment 4 and the time stamp 18 s of the latest frame in the stream media is 6 s, which is less than the delay threshold 8 s, thus the media segment 4 does not satisfy a condition of being a target media segment.

At this time, the server may take the media segment 3 as the to-be-processed media segment, and calculates the difference between the start time 8 s of the media segment 3 and the time stamp 18 s of the latest frame in the streaming media as 10 s. Because the time difference between the media segment 3 and the time stamp of the latest frame in the streaming media is greater than the delay threshold 8 s, the media segment 3 is taken as the target media segment, and is combined with the MPD file and the initialization segment to generate the starting segment.

In other examples, in response to there being no media segment with a time difference between a start time and the timestamp of the latest frame in the streaming media greater than the delay threshold in each media segment, the server takes a media segment with an earliest start time in each media segment as the target media segment.

Taking selecting a target media segment from media segment 1[0 s,4 s], media segment [4 s,8 s], media segment 3[8 s, 12 s], and media segment 4[12 s,16 s] as an example, the delay threshold is 20 s, and the time stamp of the latest frame in the streaming media is 17 s.

At this time, it can be seen that, after traversing, the server determines that the time difference between the start time of each media segment and the time stamp of the latest frame in the streaming media is smaller than the delay threshold, and at this time, the server takes the media segment 1[0 s, 4 s] as the target media segment to generate the starting segment.

By traversing the media segments according to the start time, the server may quickly generate the target media segment that meets the delay threshold. Then, the server generates a staring segment according to the MPD file, the initialization segment, and the target media segment, and sends the starting segment to the terminal.

In another specific flow of determining a starting segment according to a predetermined delay threshold value, a server may generate a plurality of starting segments in advance, and after receiving a live-streaming starting request, the server selects a starting segment complying with the delay threshold from the plurality of starting segments and sends it to a terminal, thereby improving the delivery efficiency of the starting segments.

Figure 5:
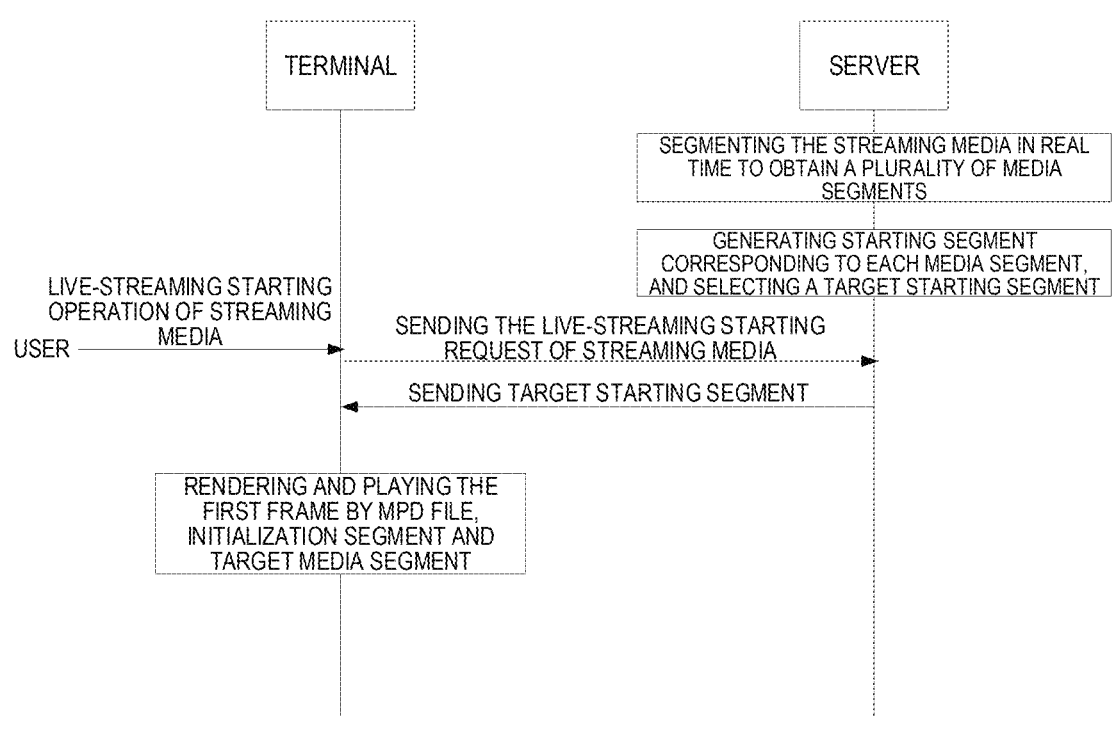
FIG. 5 is a schematic diagram of data flow of another live-streaming starting method according to an embodiment of the present disclosure.

Specifically, FIG. 5 is a schematic diagram of data flow of another live-streaming starting method according to an implementation of the present disclosure.

As shown in FIG. 5, firstly, the server segments the streaming media according to a timestamp of each frame in the streaming media to obtain a plurality of continuous media segments with a same segment duration. Subsequently, the server generates a plurality of starting segments according to each media segment, wherein different starting segments comprise the media presentation description MPD file, the initialization segment and different media segments.

For example, after encoding a latest frame of streaming media, the server segments the existing streaming media to obtain a plurality of media segments including media segment 1[0 s,4 s], media segment 2[4 s,8 s], media segment 3[8 s,12 s], and media segment 4[12 s,16 s].

Afterward, the server combines each media segment with an MPD file and an initialization segment respectively to obtain a starting segment 1[MPD file, initialization segment, media segment 1]; a starting segment 2[MPD file, initialization segment, media segment 2]; a staring segment 3[MPD file, initialization segment, media segment 3]; and a starting segment 4[MPD file, initialization segment, media segment 4].

Then, the server selects a target starting segment from each starting segment according to a predetermined delay threshold. Specifically, the server selects a target media segment corresponding to the delay threshold according to the predetermined delay threshold, and takes the starting segment corresponding to the target media segment as the target starting segment.

For example, similar to the foregoing selection of the target media segment, the server selects, according to a start time of media segment in each starting segment, a starting segment corresponding to media segment with a latest start time from all unselected starting segments as a to-be-processed starting segment. Then, the server determines whether a time difference between the start time of the media segment of to-be-processed starting segment and a timestamp of a latest frame in the streaming media is greater than the delay threshold; in response to the time difference being greater than the delay threshold, taking the to-be-processed starting segment as the target starting segment; or in response to the time difference not being greater than the delay threshold, returning to the step of selecting a starting segment corresponding to the media segment with a latest start time from all unselected starting segments as a to-be-processed starting segment.

Taking the above starting segment 1, starting segment 2, starting segment 3 and starting segment 4 as an example, the delay threshold is 8 s, and the timestamp of the latest frame in the streaming media is 18 s.

Since the start time of the media segment 4 in the starting segment 4 is 12 s, that is the latest start time, the server firstly takes the starting segment 4 as the to-be-processed starting segment. It can be seen that the time difference between the start time 12 s of the media segment 4 in the starting segment 4 and the timestamp 18 s of the latest frame in the streaming media is 6 s, which is less than the delay threshold 8 s, the starting segment 4 does not satisfy the condition of being a target starting segment.

At this time, the server takes the starting segment 3 as the to-be-processed starting segment, and calculates the difference between the start time 8 s of the corresponding media segment 3 and the timestamp 18 s of the latest frame in the streaming media, to obtain the time difference being 10 s. Because the time difference between the media segment 3 and the timestamp of the latest frame in the streaming media is greater than the delay threshold 8 s, the starting segment 3 is taken as the target starting segment.

Likewise, in response to there being no starting segment with a time difference between a start time of the media segment and the timestamp of the latest frame in the streaming media greater than the delay threshold in each starting segment, the server takes a starting segment with an earliest start time in each starting segment as the target starting segment.

By traversing according to the start time of each media segment in the starting segment, the server may quickly determine a target starting segment which satisfies a delay threshold. Subsequently, the server further updates the target starting segment in real time as the encoding of each frame of the streaming media is completed, to ensure that the target starting segment currently selected by the server satisfies the delay threshold, that is, the server updates the target starting segment according to the timestamp of the latest frame of the streaming media.

Finally, as shown in FIG. 5, because the server pre-stores the target starting segment satisfying the delay threshold in real time, after receiving the live-streaming starting request sent by the terminal, the server may directly deliver the target starting segment to the terminal, so that the terminal renders and plays the first frame by using the MPD file, the initialization segment, and the target media segment in the target starting segment.

This manner may further improve the response efficiency of the server for the live-streaming starting request, thereby implementing fast rendering and playing of the first frame by the terminal.

According to the method provided in the implementation of the present disclosure, on the basis of a DASH protocol, a live-streaming starting process is improved, to enable a terminal to render and play the first frame only by initiating a starting request once, thereby effectively reducing the starting time and improving the user experience.

Figure 6:
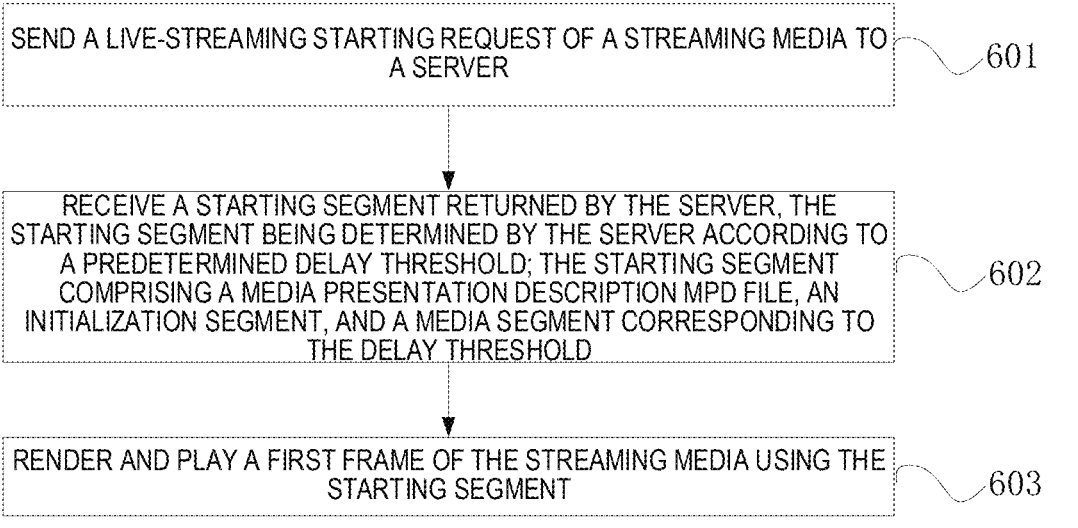
FIG. 6 is a schematic flowchart of another live-streaming starting method according to an embodiment of the present disclosure.

Based on the foregoing embodiments, FIG. 6 is a schematic flowchart of another live-streaming starting method according to an embodiment of the present disclosure. As shown in FIG. 6, the live-streaming starting method may include the following steps:

Step 601, sending a live-streaming starting request of a streaming media to a server.

Step 602, receiving a starting segment returned by the server, the starting segment being determined by the server according to a predetermined delay threshold; the starting segment comprising a media presentation description MPD file, an initialization segment, and a media segment corresponding to the delay threshold.

Step 603, rendering and playing a first frame of the streaming media using the starting segment.

Specifically, as for streaming media, it should be uploaded to a sever by a user providing the streaming media, and the media form thereof includes, but is not limited to, video media and audio media. The terminal mentioned in this embodiment may be the second terminal shown in FIG. 2, that is, the terminal used by the user on-demand.

A user may initiate a streaming media on-demand operation by using the terminal, and the terminal generates a corresponding live-streaming starting request according to the on-demand operation, and sends the live-streaming starting request to a server.

After the user sends the live-streaming starting request to the server, the server responds to the live-streaming starting request according to the ways provided in the foregoing implementations, and delivers the media segment including the media presentation description MPD file, the initialization segment, and the media segment corresponding to the delay threshold to the terminal for rendering and playing.

In an optional embodiment, the starting segment include an MP4 format file.

With respect to a response process of the server for the live-streaming starting request, reference may be made to the foregoing implementations, and details are not repeated herein in this implementation.

In this implementation, after the sending the live-streaming starting request only once, the terminal may obtain the starting segments including the MPD file, the initialization segment, and the media segment corresponding to the delay threshold, thereby reducing duration required for the starting, and improving user experience.

The delay threshold in the implementation of the present disclosure is predetermined by the server, in order to facilitate the terminal to make a request for the next frame of data of the streaming media subsequently, in an optional implementation, the starting segment further comprises a segment serial number of the media segment and a start time of the media segment; the method further comprises: generating an obtaining request for a next frame of the streaming media according to the segment serial number of the media segment and the start time of the media segment; and sending the obtaining request for the next frame to the server.

By carrying related information such as a start time and a segment serial number of a media segment in a starting segment, a terminal may use the information to calculate a segment serial number of a media segment of a next frame, thus to directly request a media segment of next frame from a server, thereby improving the obtaining efficiency of the next frame.

According to the method provided in the implementation of the present disclosure, on the basis of a DASH protocol, a live-streaming starting process is improved, to enable a terminal to render and play a first frame only by initiating a starting request once, thereby effectively reducing a starting time and improving the user experience.

Figure 7:
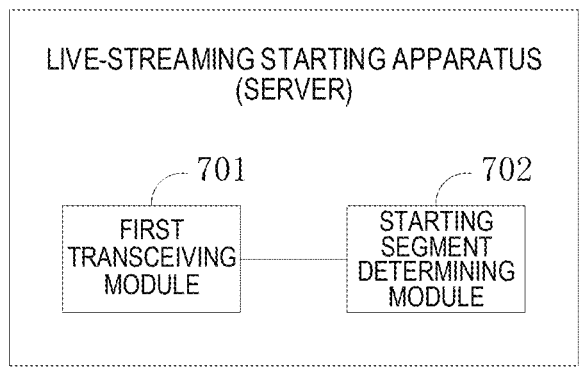
FIG. 7 is a structural block diagram of a live-streaming starting apparatus provided by an embodiment of the present disclosure.

Corresponding to the video effect processing method in the above embodiments, FIG. 7 is a structural block diagram of a live-streaming starting apparatus provided by an embodiment of the present disclosure. For ease of description, only parts related to the embodiments of the present disclosure are shown. Referring to FIG. 7, a live-streaming starting apparatus, applied to a server, includes:

a first transceiving module 701 configured to receive a live-streaming starting request initiated by a terminal for streaming media;

a starting segment determining module 702 configured to determine a starting segment according to a predetermined delay threshold, the starting segment comprising a media presentation description MPD file, an initialization segment, and a media segment corresponding to the delay threshold; and the first transceiving module 701 further configured to send the starting segment to the terminal, the starting segment being used for rendering the first frame of live-streaming in response to the terminal starting live-streaming.

Optionally, the starting segment further comprises a segment serial number of the media segment and a start time of the media segment; wherein the segment serial number of the media segment and the start time of the media segment are used to generate an obtaining request of the terminal for a next frame.

Optionally, the starting segment determining module 702 is specifically configured for:

segmenting the streaming media according to a timestamp of each frame in the streaming media to obtain a plurality of continuous media segments with a same segment duration; selecting a target media segment corresponding to the delay threshold according to a predetermined delay threshold; and generating the starting segment according to the MPD file, the initialization segment, and the target media segment.

Optionally, the starting segment determining module 702 is specifically configured for:

selecting, according to a start time of each media segment, a media segment with a latest start time from all unselected media segments as a to-be-processed media segment; determining whether a time difference between the start time of the to-be-processed media segment and a timestamp of a latest frame in the streaming media is greater than the delay threshold; in response to the time difference being greater than the delay threshold, taking the to-be-processed media segment as the target media segment; or in response to the time difference not being greater than the delay threshold, returning to the step of selecting, according to the start time of each media segment, a media segment with a latest start time from all unselected media segments as a to-be-processed media segment.

Optionally, in response to there being no media segment with a time difference between a start time and the timestamp of the latest frame in the streaming media greater than the delay threshold in each media segment, the starting segment determining module 702 is further configured for taking a media segment with an earliest start time in each media segment as the target media segment.

Optionally, the starting segment determining module 702 is specifically configured for:

segmenting the streaming media according to a timestamp of each frame in the streaming media to obtain a plurality of continuous media segments with a same segment duration; generating a plurality of starting segments according to each media segment, wherein different starting segments comprise the MPD file, the initialization segment and different media segments; selecting a target starting segment from each starting segment according to a predetermined delay threshold; and taking the target starting segment as the staring segment sent to the terminal.

Optionally, the starting segment determining module 702 is specifically configured for:

selecting a target media segment corresponding to the delay threshold according to a predetermined delay threshold; and taking the staring segment corresponding to the target media segment as the target starting segment.

Optionally, the starting segment determining module 702 is specifically configured for:

updating the target starting segment according to the timestamp of the latest frame of the streaming media.

Optionally, the starting segment comprises an MP4 format file.

According to the apparatus provided in the implementation of the present disclosure, on the basis of a DASH protocol, a live-streaming starting process is improved, to enable a terminal to render and play a first frame only by initiating a starting request once, thereby effectively reducing a starting time and improving the user experience.

Figure 8:
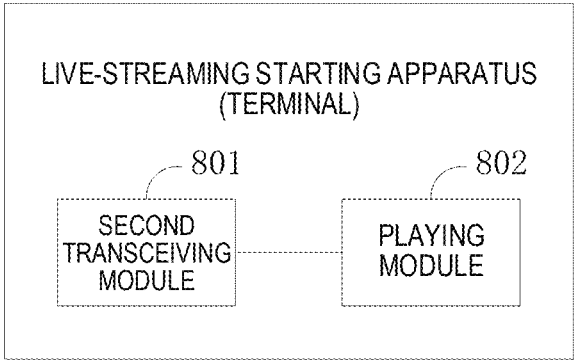
FIG. 8 is a structural block diagram of another live-streaming starting apparatus provided by an embodiment of the present disclosure.

Corresponding to the video effect processing method in the above embodiments, FIG. 8 is a structural block diagram of another live-streaming starting apparatus provided in an embodiment of the present disclosure. For ease of description, only parts related to the embodiments of the present disclosure are shown. Referring to FIG. 8, a live-streaming starting apparatus is applied to a terminal, and the device includes:

a second transceiving module 801 configured to send a live-streaming starting request of a streaming media to a server;

the second transceiving module 801 further configured to receive a starting segment returned by the server, the starting segment being determined by the server according to a predetermined delay threshold; the starting segment comprising a media presentation description MPD file, an initialization segment, and a media segment corresponding to the delay threshold; and a playing module 802 configured to render and play a first frame of the streaming media using the starting segment.

Optionally, the starting segment comprise an MP4 format file.

Optionally, the starting segment further comprises a segment serial number of the media segment and a start time of the media segment;

the second transceiving module 801 is further configured for:

generating an obtaining request for a next frame of the streaming media according to the segment serial number of the media segment and the start time of the media segment; and sending the obtaining request for the next frame to the server.

According to the apparatus provided in the implementation of the present disclosure, on the basis of a DASH protocol, a live-streaming starting process is improved, to enable a terminal to render and play a first frame only by initiating a starting request once, thereby effectively reducing a starting time and improving the user experience.

The electronic device provided in this embodiment may be used to execute the technical solutions of the foregoing method embodiments, and implementation principles and technical effects are similar, and are not repeated here in this embodiment.

Figure 9:
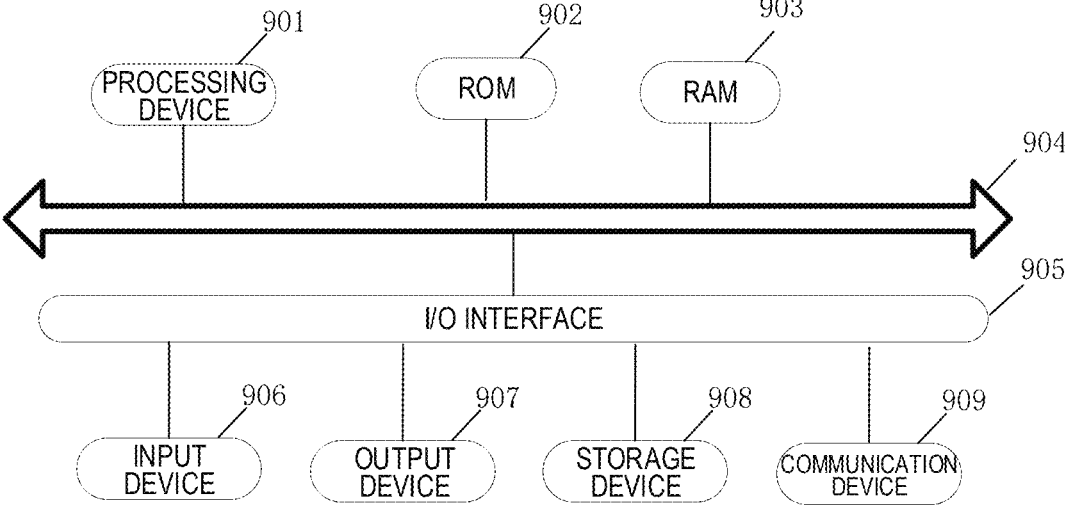
FIG. 9 is a schematic diagram of a hardware structure of an electronic device according to an embodiment of the present disclosure.

Referring to FIG. 9, it shows a schematic structural diagram of an electronic device 900 suitable for implementing embodiments of the present disclosure. The electronic device 900 may be a terminal device or a server. The terminal device may include, but is not limited to, a mobile terminal such as a mobile phone, a notebook computer, a digital broadcast receiver, a personal digital assistant (PDA), a portable android device (PAD), a portable multimedia player (PMP), a vehicle-mounted terminal (for example, a vehicle-mounted navigation terminal), and the like, and a fixed terminal such as a digital TV, a desktop computer, and the like. The electronic device shown in FIG. 9 is merely an example and should not bring any limitation to the functions and scope of use of the embodiments of the present disclosure.

As shown in FIG. 9, the electronic device 900 may include processing device (e.g., central processing unit, graphics processing unit, etc.) 901 that may perform various suitable actions and processes in accordance with a program stored in read only memory (ROM) 902 or a program loaded into random access memory (RAM) 903 from storage device 908. In the RAM 903, various programs and data necessary for the operation of the electronic device 900 are also stored. The processing device 901, the ROM 902, and the RAM 903 are connected to each other via a bus 904. An input/output (I/O) interface 905 is also connected to the bus 904.

In general, the following devices may be connected to the I/O interface 905: an input device 906 including, for example, a touch screen, a touch pad, a keyboard, a mouse, a camera, a microphone, an accelerometer, a gyroscope, or the like; an output device 907 including, for example, a liquid crystal display (LCD), a speaker, a vibrator, or the like; a storage device 908 including, for example, a magnetic tape, a hard disk, or the like; and a communication device 909. The communication device 509 may allow electronic device 900 to communicate wirelessly or wired with other devices to exchange data. While FIG. 9 illustrates an electronic device 900 with a variety of component, it should be understood that it is not required that all of the illustrated components be implemented or provided. More or fewer components may alternatively be implemented or provided.

In particular, the processes described above with reference to the flowcharts may be implemented as computer software programs in accordance with embodiments of the present disclosure. For example, embodiments of the present disclosure include a computer program product comprising a computer program carried on a non-transitory computer readable medium. The computer program comprises a program code for executing the method as shown in the flowchart. In such an embodiment, the computer program may be downloaded and installed from the network via communications device 909, or installed from storage device 908, or installed from ROM 902. When the computer program is executed by the processing device 901, the above-described functions defined in the method of embodiments of the present disclosure are executed.

It should be noted that the computer readable medium in the present disclosure may be a computer readable signal medium or a computer readable storage medium, or any combination thereof. A computer readable storage medium may be, for example, but not limited to, an electronic, magnetic, optical, electromagnetic, infrared, or semiconductor system, apparatus, or device, or any suitable combination of the foregoing. More specific examples of the computer readable storage medium may include, but are not limited to, an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the present disclosure, a computer readable storage medium may be any tangible medium that can contain or store a program for use by or in connection with an instruction execution system, apparatus, or device. While in the present disclosure, a computer readable signal medium may include a propagated data signal with computer readable program code embodied therein, for example, in baseband or as part of a carrier wave. Such a propagated signal may take any of a variety of forms, including, but not limited to, electromagnetic signal, optical signal, or any suitable combination thereof. A computer readable signal medium may also be any computer readable medium that is not a computer readable storage medium and that can send, propagate, or transport a program for use by or in connection with an instruction execution system, apparatus, or device. Program code embodied on a computer readable medium may be transmitted using any appropriate medium, including, but not limited to, wireline, optical fiber cable, RF (radio frequency), etc., or any suitable combination of the foregoing.

The above computer readable medium may be included in the electronic device, or may exist separately and not be installed in the electronic device.

The above computer readable medium carries one or more programs. When the one or more programs are executed by the electronic device, the electronic device is enabled to execute the method of above embodiments.

Computer program code for carrying out operations of the present disclosure may be written in any combination of one or more programming languages, including an object oriented programming language such as Java, Smalltalk, C++ or the like and conventional procedural programming languages, such as the 'C' programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The embodiments of this disclosure provide a computer program product, comprising a computer instruction, the computer instruction, when executed by a processor, implementing any of above methods, the implementation principles and technical effects are similar, and are not repeated here in this embodiment.

The embodiments of this disclosure provide a computer program, wherein the computer program, when executed by a processor, implementing any of above methods, the implementation principles and technical effects are similar, and are not repeated here in this embodiment.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, a program segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart, and combinations of blocks in the block diagrams and/or flowchart, can be implemented by special purpose hardware-based systems that perform the specified functions or acts, or combinations of special purpose hardware and computer instructions.

The modules involved in the embodiments of the present disclosure may be implemented through software or hardware. The name of a module does not constitute a limitation to the module itself in some cases, for example, the first acquisition unit may also be described as "unit to acquire at least two internet protocol addresses".

The functions described herein above may be performed, at least in part, by one or more hardware logic components. For example, without limitation, exemplary types of hardware logic components that can be used include Field-programmable Gate Arrays (FPGAs), Program-specific Integrated Circuits (ASICs), Application-specific Standard Products (ASSPs), System-on-a-chip systems (SOCs), Complex Programmable Logic Devices (CPLDs), etc.

In the context of this disclosure, a machine-readable medium may be tangible media that may contain or store a program for use by or in connection with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination of the foregoing. More specific examples of machine-readable storage media include an electrical connection based on one or more wires, a portable computer diskette, a hard disk, a random access memory (RAM), a read-only memory (ROM), an erasable programmable read-only memory (EPROM or Flash memory), an optical fiber, a compact disc read-only memory (CD-ROM), an optical storage device, a magnetic storage device, or any suitable combination of the foregoing.

The following are some embodiments of the present disclosure.

In a first aspect, according to one or more embodiments of the present disclosure, a live-streaming starting method, applied to a server; the method comprises:

receiving a live-streaming starting request initiated by a terminal for streaming media;

determining a starting segment according to a predetermined delay threshold, the starting segment comprising a media presentation description MPD file, an initialization segment, and a media segment corresponding to the delay threshold; and sending the starting segment to the terminal, the starting segment being used for rendering the first frame of live-streaming in response to the terminal starting live-streaming.

Optionally, the starting segment further comprises a segment serial number of the media segment and a start time of the media segment; wherein the segment serial number of the media segment and the start time of the media segment are used to generate an obtaining request of the terminal for a next frame.

Optionally, the determining a starting segment according to a predetermined delay threshold comprises:

segmenting the streaming media according to a timestamp of each frame in the streaming media to obtain a plurality of continuous media segments with a same segment duration;

selecting a target media segment corresponding to the delay threshold according to a predetermined delay threshold; and generating the starting segment according to the MPD file, the initialization segment, and the target media segment.

Optionally, the selecting a target media segment corresponding to the delay threshold according to a predetermined delay threshold comprises:

selecting, according to a start time of each media segment, a media segment with a latest start time from all unselected media segments as a to-be-processed media segment; determining whether a time difference between the start time of the to-be-processed media segment and a timestamp of a latest frame in the streaming media is greater than the delay threshold; in response to the time difference being greater than the delay threshold, taking the to-be-processed media segment as the target media segment; or in response to the time difference not being greater than the delay threshold, returning to the step of selecting, according to the start time of each media segment, a media segment with a latest start time from all unselected media segments as a to-be-processed media segment.

Optionally, in response to there being no media segment with a time difference between a start time and the timestamp of the latest frame in the streaming media greater than the delay threshold in each media segment, the method further comprises: taking a media segment with an earliest start time in each media segment as the target media segment.

Optionally, the method further comprises:

segmenting the streaming media according to a timestamp of each frame in the streaming media to obtain a plurality of continuous media segments with a same segment duration; generating a plurality of starting segments according to each media segment, wherein different starting segments comprise the MPD file, the initialization segment and different media segments; selecting a target starting segment from each starting segment according to a predetermined delay threshold; the determining a starting segment according to a predetermined delay threshold comprises: taking the target starting segment as the staring segment sent to the terminal.

Optionally, the selecting a target starting segment from each starting segment according to a predetermined delay threshold comprises: selecting a target media segment corresponding to the delay threshold according to a predetermined delay threshold; and taking the staring segment corresponding to the target media segment as the target starting segment.

Optionally, the method further comprises: updating the target starting segment according to the timestamp of the latest frame of the streaming media.

Optionally, the starting segment comprises an MP4 format file.

In a second aspect, according to one or more embodiments of the present disclosure, a live-streaming starting method, applied to a terminal; the method comprises:

sending a live-streaming starting request of a streaming media to a server; receiving a starting segment returned by the server, the starting segment being determined by the server according to a predetermined delay threshold; the starting segment comprising a media presentation description MPD file, an initialization segment, and a media segment corresponding to the delay threshold; and rendering and playing a first frame of the streaming media using the starting segment.

Optionally, the starting segment comprise an MP4 format file.

Optionally, the starting segment further comprises a segment serial number of the media segment and a start time of the media segment; the method further comprises: generating an obtaining request for a next frame of the streaming media according to the segment serial number of the media segment and the start time of the media segment; and sending the obtaining request for the next frame to the server.

In a third aspect, according to one or more embodiments of the present disclosure, a live-streaming starting apparatus, applied to a server; the apparatus comprises:

a first transceiving module configured to receive a live-streaming starting request initiated by a terminal for streaming media;

a starting segment determining module configured to determine a starting segment according to a predetermined delay threshold, the starting segment comprising a media presentation description MPD file, an initialization segment, and a media segment corresponding to the delay threshold; and the first transceiving module further configured to send the starting segment to the terminal, the starting segment being used for rendering the first frame of live-streaming in response to the terminal starting live-streaming.

Optionally, the starting segment further comprises a segment serial number of the media segment and a start time of the media segment; wherein the segment serial number of the media segment and the start time of the media segment are used to generate an obtaining request of the terminal for a next frame.

Optionally, the starting segment determining module is specifically configured for:

segmenting the streaming media according to a timestamp of each frame in the streaming media to obtain a plurality of continuous media segments with a same segment duration; selecting a target media segment corresponding to the delay threshold according to a predetermined delay threshold; and generating the starting segment according to the MPD file, the initialization segment, and the target media segment.

Optionally, the starting segment determining module is specifically configured for:

selecting, according to a start time of each media segment, a media segment with a latest start time from all unselected media segments as a to-be-processed media segment; determining whether a time difference between the start time of the to-be-processed media segment and a timestamp of a latest frame in the streaming media is greater than the delay threshold; in response to the time difference being greater than the delay threshold, taking the to-be-processed media segment as the target media segment; or in response to the time difference not being greater than the delay threshold, returning to the step of selecting, according to the start time of each media segment, a media segment with a latest start time from all unselected media segments as a to-be-processed media segment.

Optionally, in response to there being no media segment with a time difference between a start time and the timestamp of the latest frame in the streaming media greater than the delay threshold in each media segment, the starting segment determining module is further configured for: taking a media segment with an earliest start time in each media segment as the target media segment.

Optionally, the starting segment determining module is specifically configured for:

segmenting the streaming media according to a timestamp of each frame in the streaming media to obtain a plurality of continuous media segments with a same segment duration; generating a plurality of starting segments according to each media segment, wherein different starting segments comprise the MPD file, the initialization segment and different media segments; selecting a target starting segment from each starting segment according to a predetermined delay threshold; and taking the target starting segment as the staring segment sent to the terminal.

Optionally, the starting segment determining module is specifically configured for:

selecting a target media segment corresponding to the delay threshold according to a predetermined delay threshold; and taking the staring segment corresponding to the target media segment as the target starting segment.

Optionally, the starting segment determining module is further configured for:

updating the target starting segment according to the timestamp of the latest frame of the streaming media.

Optionally, the starting segment comprises an MP4 format file.

In a fourth aspect, according to one or more embodiments of the present disclosure, a live-streaming starting apparatus, applied to a terminal; the apparatus comprising:

a second transceiving module configured to send a live-streaming starting request of a streaming media to a server;

the second transceiving module further configured to receive a starting segment returned by the server, the starting segment being determined by the server according to a predetermined delay threshold; the starting segment comprising a media presentation description MPD file, an initialization segment, and a media segment corresponding to the delay threshold; and a playing module configured to render and play a first frame of the streaming media using the starting segment.

Optionally, the starting segment comprise an MP4 format file.

Optionally, the starting segment further comprises a segment serial number of the media segment and a start time of the media segment;

the second transceiving module is further configured for:

generating an obtaining request for a next frame of the streaming media according to the segment serial number of the media segment and the start time of the media segment; and sending the obtaining request for the next frame to the server.

In a fifth aspect, according to one or more embodiments of the present disclosure, an electronic device is provided, comprising:

at least one processor, and a memory;

the memory storing a computer executable instruction;

the at least one processor executing the computer executable instruction stored in the memory, causing the at least one processor to implement any one of above methods.

In a sixth aspect, according to one or more embodiments of the present disclosure, a computer readable storage medium, wherein the computer readable storage medium stores a computer executable instruction, a processor, when executing the computer executable instruction, implements implement any one of above methods.

In a seventh aspect, according to one or more embodiments of the present disclosure, a computer program product, comprising a computer program, the computer program, when executed by a processor, implementing any one of above methods.

In an eighth aspect, according to one or more embodiments of the present disclosure, a computer program, wherein the computer program, when executed by a processor, implementing any one of above methods.

Embodiments of the present disclosure provide a live-streaming starting method, apparatus, device, storage medium, program product and program. The server receives a live-streaming starting request initiated by a terminal for streaming media; determines a starting segment according to a predetermined delay threshold, the starting segment comprising a media presentation description MPD file, an initialization segment, and a media segment corresponding to the delay threshold; and the terminal receives the starting segment sent by the server, and renders and plays a first frame of the streaming media using the starting segment. According to the method provided in the implementation of the present disclosure, on the basis of a DASH protocol, a live-streaming starting process is improved, to enable a terminal to render and play a first frame only by initiating a starting request once, thereby effectively reducing a starting time and improving the user experience.

The foregoing description is merely illustrative of the preferred embodiments of the present disclosure and of the technical principles applied thereto. As will be appreciated by those skilled in the art, the disclosure of the present disclosure is not limited to the technical solution formed by the specific combination of the described technical features, it should also cover other technical solutions formed by any combination of the described technical features or equivalent features thereof without departing from the described disclosed concept. For example, the above features and technical features having similar functions disclosed in the present disclosure (but not limited thereto) are replaced with each other to form a technical solution.

In addition, while operations are depicted in a particular order, this should not be understood as requiring that the operations be performed in the particular order shown or in sequential order. Multitasking and parallel processing may be advantageous in certain circumstances. Likewise, while several specific implementation details are included in the above discussion, these should not be construed as limiting the scope of the present disclosure. Certain features that are described in the context of separate embodiments can also be implemented in combination in a single embodiment. Conversely, various features that are described in the context of a single embodiment can also be implemented in multiple embodiments separately or in any suitable subcombination.

Although the subject matter has been described in language specific to structural features and/or methodological acts, it is to be understood that the subject matter defined in the appended claims is not necessarily limited to the specific features or acts described above. Rather, the specific features and acts described above are merely example forms of implementing the claims.

What is claimed is:

1. A live-streaming starting method, applied to a server; the method comprising:

receiving a live-streaming starting request initiated by a terminal for streaming media;

determining a starting segment according to a predetermined delay threshold, the starting segment comprising a media presentation description MPD file, an initialization segment, and a media segment corresponding to the delay threshold; and sending the starting segment to the terminal, the starting segment being used for rendering the first frame of live-streaming in response to the terminal starting live-streaming.

2. The method of claim 1, wherein the starting segment further comprises a segment serial number of the media segment and a start time of the media segment;

wherein the segment serial number of the media segment and the start time of the media segment are used to generate an obtaining request of the terminal for a next frame.

3. The method of claim 1, wherein the determining a starting segment according to a predetermined delay threshold comprises:

segmenting the streaming media according to a timestamp of each frame in the streaming media to obtain a plurality of continuous media segments with a same segment duration;

selecting a target media segment corresponding to the delay threshold according to a predetermined delay threshold; and generating the starting segment according to the MPD file, the initialization segment, and the target media segment.

4. The method of claim 3, wherein the selecting a target media segment corresponding to the delay threshold according to a predetermined delay threshold comprises:

selecting, according to a start time of each media segment, a media segment with a latest start time from all unselected media segments as a to-be-processed media segment;

determining whether a time difference between the start time of the to-be-processed media segment and a timestamp of a latest frame in the streaming media is greater than the delay threshold;

in response to the time difference being greater than the delay threshold, taking the to-be-processed media segment as the target media segment; or in response to the time difference not being greater than the delay threshold, returning to the step of selecting, according to the start time of each media segment, a media segment with a latest start time from all unselected media segments as a to-be-processed media segment.

5. The method of claim 4, wherein in response to there being no media segment with a time difference between a start time and the timestamp of the latest frame in the streaming media greater than the delay threshold in each media segment, the method further comprises:

taking a media segment with an earliest start time in each media segment as the target media segment.

6. The method of claim 1, further comprising:

segmenting the streaming media according to a timestamp of each frame in the streaming media to obtain a plurality of continuous media segments with a same segment duration;

generating a plurality of starting segments according to each media segment, wherein different starting segments comprise the MPD file, the initialization segment and different media segments;

selecting a target starting segment from each starting segment according to a predetermined delay threshold;

the determining a starting segment according to a predetermined delay threshold comprises:

taking the target starting segment as the staring segment sent to the terminal.

7. The method of claim 6, wherein the selecting a target starting segment from each starting segment according to a predetermined delay threshold comprises:

selecting a target media segment corresponding to the delay threshold according to a predetermined delay threshold; and taking the staring segment corresponding to the target media segment as the target starting segment.

8. The method of claim 7, further comprising:

updating the target starting segment according to the timestamp of the latest frame of the streaming media.

9. The method of claim 1, wherein the starting segment comprises an MP4 format file.

10. A live-streaming starting method, applied to a terminal;

the method comprising:

sending a live-streaming starting request of a streaming media to a server;

receiving a starting segment returned by the server, the starting segment being determined by the server according to a predetermined delay threshold; the starting segment comprising a media presentation description MPD file, an initialization segment, and a media segment corresponding to the delay threshold; and rendering and playing a first frame of the streaming media using the starting segment.

11. The method of claim 10, wherein the starting segment comprise an MP4 format file.

12. The method of claim 10, wherein the starting segment further comprises a segment serial number of the media segment and a start time of the media segment;

the method further comprises:

generating an obtaining request for a next frame of the streaming media according to the segment serial number of the media segment and the start time of the media segment; and sending the obtaining request for the next frame to the server.

13. An electronic device, comprising:

at least one processor, and a memory;

the memory storing a computer executable instruction;

the at least one processor executing the computer executable instruction stored in the memory, causing the at least one processor to implement acts comprising:

receiving a live-streaming starting request initiated by a terminal for streaming media;

determining a starting segment according to a predetermined delay threshold, the starting segment comprising a media presentation description MPD file, an initialization segment, and a media segment corresponding to the delay threshold; and sending the starting segment to the terminal, the starting segment being used for rendering the first frame of live-streaming in response to the terminal starting live-streaming.

14. The electronic device of claim 13, wherein the starting segment further comprises a segment serial number of the media segment and a start time of the media segment;

wherein the segment serial number of the media segment and the start time of the media segment are used to generate an obtaining request of the terminal for a next frame.

15. The electronic device of claim 13, wherein the determining a starting segment according to a predetermined delay threshold comprises:

segmenting the streaming media according to a timestamp of each frame in the streaming media to obtain a plurality of continuous media segments with a same segment duration;

selecting a target media segment corresponding to the delay threshold according to a predetermined delay threshold; and generating the starting segment according to the MPD file, the initialization segment, and the target media segment.

16. The electronic device of claim 15, wherein the selecting a target media segment corresponding to the delay threshold according to a predetermined delay threshold comprises:

selecting, according to a start time of each media segment, a media segment with a latest start time from all unselected media segments as a to-be-processed media segment;

determining whether a time difference between the start time of the to-be-processed media segment and a timestamp of a latest frame in the streaming media is greater than the delay threshold;

in response to the time difference being greater than the delay threshold, taking the to-be-processed media segment as the target media segment; or in response to the time difference not being greater than the delay threshold, returning to the step of selecting, according to the start time of each media segment, a media segment with a latest start time from all unselected media segments as a to-be-processed media segment.

17. The electronic device of claim 16, wherein in response to there being no media segment with a time difference between a start time and the timestamp of the latest frame in the streaming media greater than the delay threshold in each media segment, the acts further comprises:

taking a media segment with an earliest start time in each media segment as the target media segment.

18. The electronic device of claim 13, the acts further comprising:

segmenting the streaming media according to a timestamp of each frame in the streaming media to obtain a plurality of continuous media segments with a same segment duration;

generating a plurality of starting segments according to each media segment, wherein different starting segments comprise the MPD file, the initialization segment and different media segments;

selecting a target starting segment from each starting segment according to a predetermined delay threshold;

the determining a starting segment according to a predetermined delay threshold comprises:

taking the target starting segment as the staring segment sent to the terminal.

19. The electronic device of claim 18, wherein the selecting a target starting segment from each starting segment according to a predetermined delay threshold comprises:

selecting a target media segment corresponding to the delay threshold according to a predetermined delay threshold; and taking the staring segment corresponding to the target media segment as the target starting segment.

20. The electronic device of claim 19, the acts further comprising:

updating the target starting segment according to the timestamp of the latest frame of the streaming media.

* * * * *